United States Patent [19]

Choi

[11] Patent Number: 5,126,613
[45] Date of Patent: Jun. 30, 1992

[54] COIL PATTERN OF FREQUENCY GENERATOR

[75] Inventor: Chun Choi, Kyungki, Rep. of Korea

[73] Assignee: Samsung Electro-Mechanics Co., Ltd., Suweon, Rep. of Korea

[21] Appl. No.: 619,203

[22] Filed: Nov. 28, 1990

[30] Foreign Application Priority Data

Nov. 29, 1989 [KR] Rep. of Korea .................. 89-17414

[51] Int. Cl.⁵ .............................................. H02K 17/00
[52] U.S. Cl. .................................. 310/208; 310/68 R; 310/71
[58] Field of Search ......... 310/208, 68 R, 71, DIG. 6, 310/198, 202; 361/152, 154

[56] References Cited

U.S. PATENT DOCUMENTS

| | | | |
|---|---|---|---|
| 4,260,920 | 4/1981 | Nakamura et al. | 310/68 R |
| 4,677,332 | 6/1987 | Heyrand | 310/208 |
| 4,902,923 | 2/1990 | Okauchi | 310/71 |
| 4,975,607 | 12/1990 | Hara et al. | 310/208 |
| 5,006,765 | 4/1991 | Schmider | 310/71 |

Primary Examiner—Steven L. Stephan
Assistant Examiner—Matthew Nguyen
Attorney, Agent, or Firm—Ladas & Parry

[57] ABSTRACT

The invention can increase the induced voltage by arranging two adjacent frequency generating coils serially, and also suppress the variation of the induced voltage by omitting the teeth pattern of the frequency generating coils at the opposite position of the section where the coil pattern is not provided due to the driving circuit elements. In addition, the driving circuit elements are mounted on both inner and outer sides of the coil pattern on a single PCB and the expensive dual pattern PCB or any additional PCB is not required, so that the manufacturing cost is reduced and the assembling process becomes easier.

2 Claims, 2 Drawing Sheets

COIL PATTERN OF FREQUENCY GENERATOR

BACKGROUND OF THE INVENTION

The present invention relates to a coil pattern of a frequency generator which provides a frequency signal proportionally to the revolution speed of a motor.

In general, the structure of a conventional drum motors used in a VTR(Video Tape Recorder) or a DAT(-Digital Audio Tape) comprises a core 4 wound with a coil 3 which is mounted on the upper side of a base 2 fixed to printed circuit boards PCB 1 and 1', a rotor case 6 with a magnet 5 which is installed at the outer side of the core 4, and a shaft 8 which is installed at the center of the rotor case 6, being supported by a bearing 7.

Thus, the rotor case 6 is revolved by the interaction of the magnet 5 in the rotor case 6 with the coil 3, if the current flows through the coil 3 wound around the core 4. On the other hand, the PCB 1a is provided with a driving circuit element mounting part 10 and the PCB 1 for a coil pattern of frequency generation is mounted on this PCB 1a.

As shown in FIG. 2 (A), a coil pattern of rectangular teeth type is formed around the PCB 1 and has contact points (e) and (f) thereon through 360°. Also, the lower side of the magnet 5 in the rotor case 6 is facing the coil pattern and provided with magnetic poles N,S,N,S, by the same pich to that of the coil pattern of the PCB 1, as shown in FIG. 2(B). (The magnet 5 is shown in an unfolded rectangular form.) Thus, a frequency signal which is proportional to the revolution speed of a motor 9 is detected when the magnet 5 is revolved according to the revolution of the rotor 6 for controlling the speed of the motor 9.

In this case, however, the PCB 1 provided with the coil pattern for frequency generation and the other PCB 1 for driving the motor 9 should be applied separately each other or with an expensive dual pattern PCB due to their size and insufficient space. Thus, the number of required components and the cost are increased and the assembling process thereof is complicated. Moreover, in the magnetic-changed frequency generation method, there is a problem that magnetic-induced noise is generated from an external magnetic field produced from a motor, a transformer and the like.

Accordingly, in order to remove this magnetic-induced noise of the frequency generating coil from the PCB to therearound, an additional coil for removing the magnetic-induced noise is provided in the opposite direction at both sides of the frequency generating coil. However, such an magnetic induced noise cannot be removed completely, and the voltage of the magnetic-induced noise has a bad effect on the revolution accuracy of the frequency generator, when the voltage of the generated frequency signal is low.

SUMMARY OF THE INVENTION

The present invention has an object to provide a coil pattern of a frequency generator which can increase the induced voltage by arranging two adjacent frequency generating coils serially. In addition, the driving circuit element is mounted on both inner and outer sides of the coil pattern on a single PCB and the expensive dual pattern PCB or any additional PCB is not required, so that the manufacturing cost is reduced and the assembling process becomes easier.

The present invention has another object to provide a coil pattern of a frequency generator which can suppress the variation of the output voltage induced to the coil pattern by omitting the teeth type coil pattern from the opposite position of a section where the frequency generating coil pattern can not be formed due to ,the driving circuit components.

According to the present invention, there is provided a coil pattern of a frequency generator, wherein two adjacent generating coils have an equal pitch to a magnet pitch in a serial arrangement and face a magnet revolving with N and S poles, and a section for driving circuit elements is formed to install driving circuit elements which is located inside and outside of the generating coils on a single PCB. In addition, the coil pattern is formed symmetrically is such a manner that a section from which is omitted the teeth is formed at the opposite position of the section for the driving circuit elements.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENTS

Figure 1:
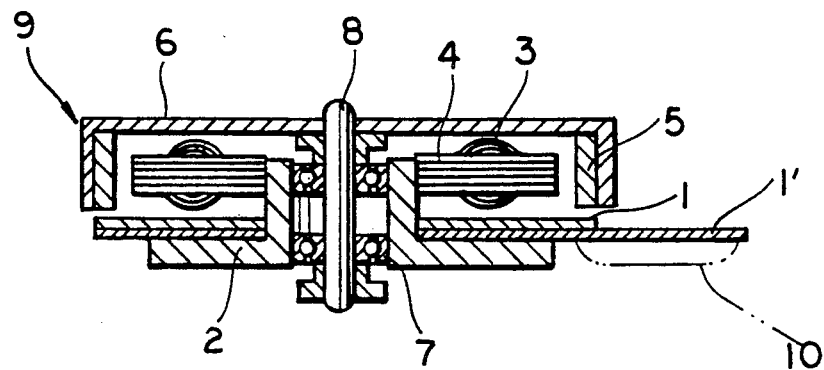
FIG. 1 is a cross-sectional view illustrating the structure of a conventional drum motor.
Figure 2A:
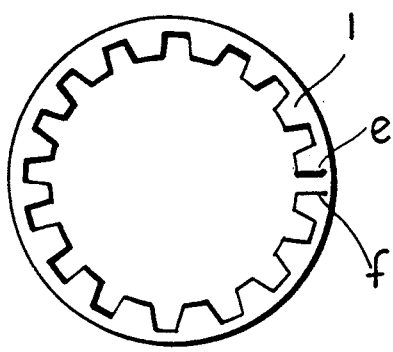
FIG. 2(A) is a plane view illustrating a PCB with a conventional pattern of a frequency generating coil.
Figure 2B:
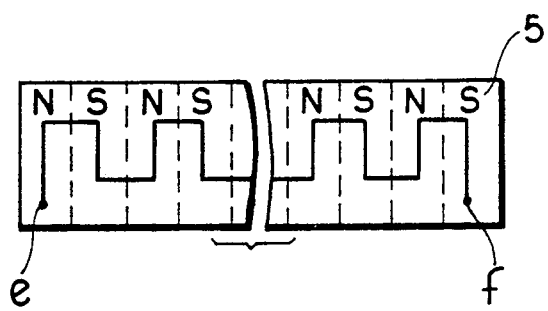
FIG. 2(B) is an unfolded view of a circular magnet with a plurality of N and S poles for explaining the relation between the magnetic poles and the coil pattern for the frequency generation according to the conventional motor.
Figure 3:
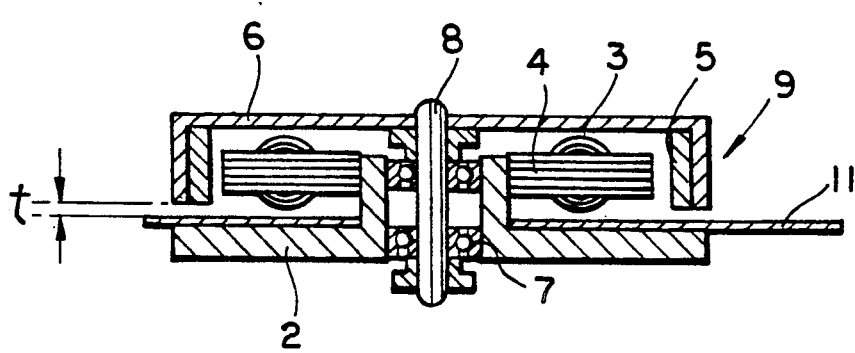
FIG. 3 is a cross-sectional view illustrating the structure of a drum motor according to the present invention.

The present invention will now be described in more detail with reference to the accompanying drawings. FIG. 3 shows a schematic cross-sectional view of a drum motor according to the present invention. In FIG. 3 the structure of a drum motor 9 is basically similar to that of the conventional drum motor. But, the drum motor 9 according to the present invention applies a single PCB for the frequency generating coil pattern and a motor driving circuit element. A circular magnet 5 in a rotor 6 is provided with a plurality of N and S poles similarly to the conventional drum motor, and thus the rotor 6 is revolved when the current flows through a coil 3 wound around a core 4 in the motor 9.

Figure 4:
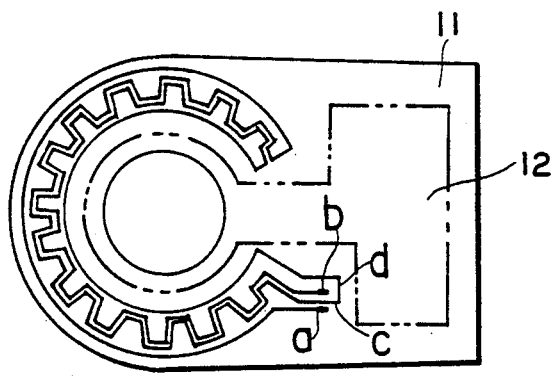
FIG. 4 is a plane view illustrating a PCB with a pattern of a frequency generating coil according to the present invention.

Also, two voltage generating coils (a-c) and (d-b) in forms of rectangular teeth of the magnet 5 are serially arranged at a single PCB 11 with a similar pitch to an interval between the N and S poles, as shown in FIG. 4. In addition, a section 12 for the driving circuit element is provided at both inner and outer sides of the voltage generating coil (a-c) and (d-b) in the coil pattern, where input and output patterns of a sensor for detecting the position of the rotor 6 and a field coil for an armature are passed through.

Figure 5:
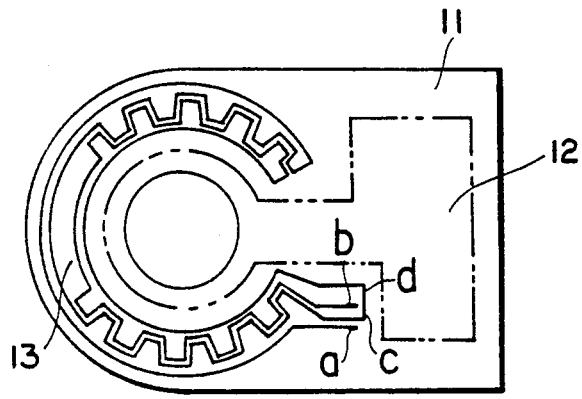
FIG. 5 is a plane view illustrating a PCB with another pattern of a frequency generating coil according to the present invention.

FIG. 5 shows another embodiment of the present invention. An air gap (t) between the PCB 11 with the frequency generating coil pattern and the bottom of the magnet 5 as shown in FIG. 3 should be uniformly provided around the circumference. However, it may be unequally manufactured due to the assembling error in manufacturing process for the motor 9, and a largest air gap is formed at the opposite position of the smallest air gap. Also, the coil pattern is not formed over all range through 360° due to the section 12 for the driving circuit element, as shown in FIG. 4, so that a certain generated voltage output can be varied according to the inequality of the air gap.

As shown in FIG. 5, therefore, the frequency generating coils (a-c) and (d-b) are formed symmetrically each other in such a manner that a section 13 from which is omitted the teeth pattern is formed at the opposite position of the section 12 for the driving circuit elements. In the present invention as shown in FIG. 5, the magnetic field is induced by an interaction between the magnet 5 and the coil pattern on the PCB 11 in response to the revolution of the rotor 6 in FIG. 3 so that a frequency signal is generated.

Figure 6A:
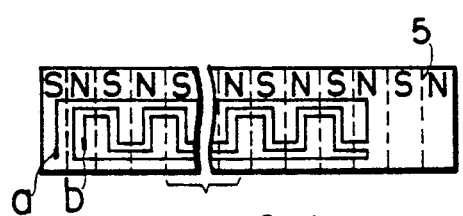
FIG. 6(A) is an unfolded view of a circular magnet with a plurality of N and S poles for explaining the relation between the magnetic poles and the coil pattern for frequency generation according to the present invention.
Figure 6B:
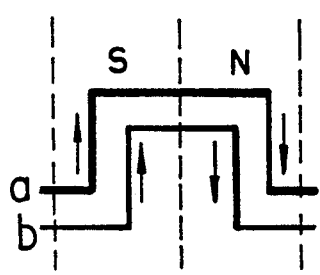
FIG. 6(B) is a detailed view of a part "A" in the FIG. 6(A)

Therefore, referring to FIG. 6, if the magnet 5 is minutely revolved from a time t1 to a time t2 and the pole position is reversely changed from N,S,N,S ... to S,N,S,N, ..., the currents through two adjacent coils (a-c) and (d-b) commonly flow in directions of the arrows shown in FIG. 6(B) so that the currents are added together and the induced voltage is doubled.

On the other hand, if the pole position is recovered from S,N,S,N, ... to N,S,N,S ... through a time t2 to a time t3, the currents in both coils flow in directions opposite to the directions indicated by the arrows in FIG. 6(B) so that the induced voltage is doubled in the same manner. Therefore, the decrease of the voltage output due to the region 12 for the driving circuit elements is sufficiently compensated and also the variation of the voltage output which is induced to the frequency generating coils is efficiently suppressed by the symmetrical structure of the coil pattern as shown in FIG. 5.

Figure 7:
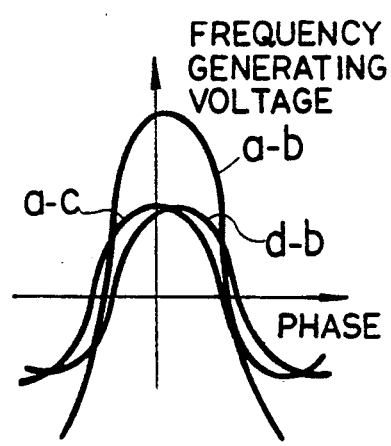
FIG. 7 is a schematic view of waveforms illustrating an output of current flowing through the frequency generating coil according to the present invention.

FIG. 7 shows the waveform of the currents flowing through the coils (a-c) and (d-b). The coils (a-c) and (d-b) in the abovementioned coil pattern are serially connected as shown in FIG. 4 and FIG. 5, so that the total current through the coil (a-b) is doubled.

As mentioned up to now, the present invention can increase the induced voltage by arranging two adjacent frequency generating coils serially and also suppress the variation of the induced voltage by omitting the teeth of the frequency generating coils at the opposite position of the section where the coil pattern is not provided due to the driving circuit elements. In addition, the driving circuit elements are mounted at both inner and outer sides of the coil pattern on a single PCB and the expensive dual pattern PCB or any additional PCB is not required, so that the manufacturing cost is reduced and the assembling process becomes easier.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modification or embodiments as fall within the true scope of the invention.

What is claimed is:

1. A frequency generator for use with a motor including a rotatable annular magnet having a series of successive N and S magnetic poles disposed thereabout, said frequency generator comprising a support member and a frequency generating coil pattern mounted on a surface of said support member, said frequency generating coil pattern having a generally C-shape, a driving circuit attaching section on said surface of said support member and extending along said surface from a position exterior to said frequency generating coil pattern to a position therewithin through a gap in the C-shape, said pattern being formed by two coils each of which includes a series of successive tooth-shaped elements having a pitch corresponding to the pitch of the magnetic poles of the magnet of said motor with which the frequency generator is used, said two coils being serially electrically connected.

2. A frequency generator according to claim 1 wherein said tooth-shaped elements are disposed along an entire length of said pattern except in a portion thereof diametrically opposite said gap.

* * * * *